United States Patent
Schmitz et al.

(10) Patent No.: US 9,500,290 B2
(45) Date of Patent: Nov. 22, 2016

(54) PRESSURE REDUCER WITH FLYWHEEL FOR CLOSING AND PUTTING INTO SERVICE

(71) Applicant: Luxembourg Patent Company S.A., Lintgen (LU)

(72) Inventors: Jean-Claude Schmitz, Heisdorf (LU); Adrien Zoda, Zoufftgen (FR)

(73) Assignee: Luxembourg Patent Company S.A., Luxembourg (LU)

( * ) Notice: Subject to any disclaimer, the term of this patent is extended or adjusted under 35 U.S.C. 154(b) by 116 days.

(21) Appl. No.: 14/379,306

(22) PCT Filed: Feb. 12, 2013

(86) PCT No.: PCT/EP2013/052772
§ 371 (c)(1),
(2) Date: Aug. 18, 2014

(87) PCT Pub. No.: WO2013/124187
PCT Pub. Date: Aug. 29, 2013

(65) Prior Publication Data
US 2015/0021503 A1 Jan. 22, 2015

(30) Foreign Application Priority Data
Feb. 20, 2012 (LU) .......................................... 91946

(51) Int. Cl.
| F16K 31/02 | (2006.01) |
| F16K 31/528 | (2006.01) |
| F16K 1/30 | (2006.01) |
| F16K 31/44 | (2006.01) |
| G05D 16/10 | (2006.01) |

(52) U.S. Cl.
CPC .............. *F16K 31/02* (2013.01); *F16K 1/306* (2013.01); *F16K 31/44* (2013.01); *F16K 31/528* (2013.01); *G05D 16/10* (2013.01); *Y10T 137/7793* (2015.04)

(58) Field of Classification Search
CPC ........ F16K 31/02; F16K 31/44; F16K 1/306; F16K 31/528; F16K 31/5284; F16K 31/5286; G05D 16/10; Y10T 137/7793; Y10T 137/7797; Y10T 137/7807; Y10T 137/7801; Y10T 137/7922

USPC .......... 137/505, 505.14, 505.24, 505.18, 535
See application file for complete search history.

(56) References Cited

U.S. PATENT DOCUMENTS 3,954,019 A 5/1976 Ferguson
5,551,477 A * 9/1996 Kanno et al. ..... F16K 31/52491
137/553

(Continued)

FOREIGN PATENT DOCUMENTS

| DE | 9111925 U1 | 1/1992 |
| EP | 1243823 A1 | 9/2002 |
| EP | 2017514 A1 | 1/2009 |
| FR | 1393971 A | 4/1965 |
| FR | 2810124 A1 | 12/2001 |

(Continued)

OTHER PUBLICATIONS

Written Opinion from corresponding International Application No. PCT/EP2013/052772, dated Aug. 26, 2014.
International Search Report from corresponding International Application No. PCT/EP2013/052772, mailed Mar. 21, 2013.

*Primary Examiner* — Michael R Reid
(74) *Attorney, Agent, or Firm* — Polster Lieder

(57) ABSTRACT

The invention relates to an on-off valve with a pressure reducer intended to be connected to a gas cylinder. The objective of the invention is to ensure that the device is closed and put into service by way of simple and reliable means at high pressures. A shutter is controlled by a mobile part of the valve with pressure reducer, forming a low-pressure chamber of the device. The shutter is subjected to an elastic force in the closing direction. A working spring of the valve with pressure reducer acts on the mobile part in the opening direction. A rotary control member working over at least one turn makes it possible to compress the working spring into the position in which the valve with pressure reducer is put into service. In the closed position, a plate of pusher of the control member is remote from the working spring.

17 Claims, 3 Drawing Sheets

(56) References Cited

U.S. PATENT DOCUMENTS

2011/0203683 A1* 8/2011 Kremer et al. .... G05D 16/0663
137/535
2012/0085445 A1* 4/2012 Risse ...................... F16K 1/443
137/637

FOREIGN PATENT DOCUMENTS

| FR | WO 2009003994 A1 * | 1/2009 | ............. F16K 1/443 |
| WO | 2006011023 A1 | 2/2006 | |
| WO | 2009074668 A1 | 6/2009 | |
| WO | 2009077520 A1 | 6/2009 | |

* cited by examiner

PRESSURE REDUCER WITH FLYWHEEL FOR CLOSING AND PUTTING INTO SERVICE

CROSS-REFERENCE TO RELATED APPLICATIONS

The present invention is the US national stage under 35 U.S.C. §371 of International Application No. PCT/EP2013/052772, which was filed on Feb. 12, 2013, 2013 and which claims the priority of application LU 91946 filed on Feb. 20, 2012 the content of which (text, drawings and claims) are incorporated here by reference in its entirety.

FIELD

The invention relates to a pressure reducing and/or regulating device for pressurized gas, more particularly to a pressure reducing and/or regulating device designed to be mounted on a cylinder of pressurized gas.

BACKGROUND

Patent document FR 1 393 971 discloses a valve with a pressure reducer for pressurized gas, consisting essentially of pressure reducer and a rotary control member configured to open and close the valve via the pressure reducer on a rotation of less than one turn. The rotary control member comprises a wheel with two vertical internal grooves in which, respectively, two pins slide, the pins being fixed with a slider in translation in a cylindrical portion of the valve body. The pins pass through, respectively, inclined grooves in the wall of the cylindrical body portion. The rotation of the wheel has therefore the effect of driving in rotation, via the pins, the slider. The movement of the pins along the inclined grooves also has the effect of translating the slider. The latter interacts with the spring of a diaphragm pressure reducer. The latter includes a membrane defining a low pressure chamber down-stream of a shutter. The shutter typically includes a seat and a movable member. The movable member is controlled by a lever mechanically linked to a movable part of the diaphragm pressure reducer. In the operating position (or opening) the slider of the control member is in the lower position and compresses the spring against the movable part. The movable part is in the lower position and thus actuates the lever so as to open the shutter. The gas fills the low pressure chamber and pressure is established there. This pressure acts against the spring of the pressure reducer via the diaphragm so as to regulate the output pressure. In the closed position, the slider is in the high position and cooperates with the lower part of the spring so as to compress it against a stop connected to the mobile part of the pressure reducer via a rod. Thus, the movable part is held in the upper position via the elastic force of the same spring. This construction is advantageous in so far as the opening and closing of the device are provided by a single shutter which is that of the pressure reducer. It is also advantageous insofar as the opening and closing is activated by a manual control member with a fast command. However, it has some drawbacks, namely that it limits the pressure of the pressure reducer, it can lead to confusion when handling and lacks compactness. Indeed, this type of diaphragm pressure reducer valve is limited to working pressures of the order of 20 to 50 bar, in particular because of the presence of the membrane. The control member provides a compression of the spring in the two positions of closing and opening. It thus has an uncertain intermediate position satisfying neither a closure nor an opening in operation of the pressure reducer valve. This results in a possible confusion during handling. Moreover, the lever construction forming an angle is cumbersome and incompatible with mounting on a gas cylinder. The level of closing safety is also very limited because any deficiency in the valve, including the control mechanism, is likely to generate a leak that, especially in certain applications of corrosive and/or hazardous gases under high pressure (>150 bar), can have serious and unacceptable consequences.

Patent document FR 2 810 124 A1 discloses a pressure-reducing valve with rotary wheel with limited angular stroke. However, the rotary wheel is limited to flow control and/or pressure of the operating gas of the pressure reducing valve. The opening and closing of gas is indeed ensured by an independent body of the quarter-turn type. The stroke of the rotary hand wheel is limited to less than one turn with one or more stops disposed on the valve body. The wheel acts directly on a screw with a thread or a ramp cooperating with a thread or a reciprocal ramp of the body so as to convert the rotational movement of the wheel into a translational movement of a plate in contact with the pressure reducer spring. This latter is neither shown nor detailed in this teaching. The hand wheel is therefore limited, in a fairly conventional manner, to adjust the regulator.

The U.S. Pat. No. 3,954,019 A discloses a valve with a hand wheel for adjusting the preload of the reducer spring. The wheel has an adjustment range corresponding to several turns and comprises means for locking in position by engagement of splines of the wheel with corresponding driving splines associated with the valve body.

SUMMARY

An objective of the present invention is to provide a pressure reducer and/or a regulation device for pressurized gas aiming to overcome at least one of the above mentioned disadvantages. More particularly, an objective of the invention is to provide a pressure reducer and/or a regulating device for pressurized gas with a simple and reliable construction, and capable of working at high pressures, in particular greater than 50 bars, more particularly greater than 100 bars, more particularly greater than 150 bars.

The invention relates to a pressure reducing and/or regulating device for pressurized gas, comprising: a body with a gas inlet, a gas outlet and a passage connecting the inlet to the outlet; a shutter disposed in the passage and adapted to close the passage; a pressure reducer and/or a regulator with a movable part adapted to actuate the shutter under the effect of the gas pressure at the outlet of the valve; a first elastic means capable of acting on the movable part in the sense of an opening of the passage means; a manual rotary control member able to open the passage acting, e.g., by compression, on the shutter via the first elastic means; remarkable in that the device further comprises a second elastic means acting on the shutter in the closing direction of the passage; and in that the control member comprises a position for closing the passage when the first elastic means are free of stress from the control member.

According to various advantageous embodiments of the invention, the control member includes a pusher acting on the first elastic means, the pusher being distant from the first elastic means in the closed position of the control member.

According to various other advantageous embodiments of the invention, the control member is configured to open and close the passage by rotation of less than one turn, e.g., half a turn or less, e.g., a quarter turn or less. In various implementations the control member comprises a stopping means in a given position corresponding to the angular closure position.

According to yet other advantageous embodiments of the invention, the control member comprises a piston accommodated in a cylindrical body portion of the device, a wheel and conversion means of the rotation of the wheel into a translational movement of the piston, the conversion means comprising at least one pin extending through a first slot in a wall portion of the cylindrical portion and cooperating with a second groove of the wheel or of the piston, at least one of first and second grooves being inclined. The inclination is relative to the longitudinal or sliding axis of the piston. The at least one inclined groove includes a corresponding notch forming a stopping means in a given angular position corresponding to the closure position. In various embodiments the at least one inclined groove is free of the stopping means in the vicinity of an angular position corresponding to the open position of the device.

According to yet other advantageous embodiments of the invention, the pusher is disposed on the piston and comprises an adjustment means, e.g., by screwing, relative to the piston.

According to yet other advantageous embodiments of the invention, the pusher comprises a means for transmitting a compressive force to the first elastic means, the transmission means comprising a contact means, e.g., with a ball, arranged at least substantially on the axis of the piston, allowing rotation of the piston relative to the first elastic means.

According to yet other advantageous embodiments of the invention, the wheel is generally cylindrical and comprises a removable cover giving access to the adjusting means of the pusher.

According to yet other advantageous embodiments of the invention, the wheel comprises at least one window in front of the piston, the device comprising at least one indication which can be seen through the at least one window in a position of the wheel corresponding to one of the open and closed positions. The at least one indication can be arranged on a disk or a holder arranged on the body between the cover and the piston. The disk or the support can comprise locating means relative to the body.

According to yet other advantageous embodiments of the invention, the at least one window is provided on the removable cover.

According to yet other advantageous embodiments of the invention, the control member comprises an elastic return means configured to release the first elastic means of compressive stresses. The control member can be configured to present in the closed position of the device a mechanical clearance between the pusher or at least one of the elements of the pusher and/or of the piston and first elastic means, e.g., the clearance being greater than 0.5 mm, e.g., 1 mm.

According to yet other advantageous embodiments of the invention, the shutter is configured so that the movement of the shutter in the closing direction of the passage is oriented substantially in the flow of gas in use.

According to further advantageous embodiments of the invention, the shutter includes a movable member and a seat, the movable member extending through the passage at the level of the seat and being linked, e.g., rigidly, to the movable part of the pressure reducer and/or regulator.

According to yet other advantageous embodiments of the invention, the second elastic means directly act on the moving part of the pressure regulator and/or regulator.

According to further advantageous embodiments of the invention, the shutter includes a movable member and a seat, the movable element member extending through the passage at the level of the seat and cooperating by a sliding engagement with the movable part of the pressure reducer and/or regulator.

According to yet other advantageous embodiments of the invention, the sliding engagement comprises a stopper in the direction of approximation of the movable part of the pressure reducer and/or regulator with the movable member of the shutter and is free in the opposite direction.

According to yet other advantageous embodiments of the invention, the second elastic means act directly on the movable element of the movable member of the shutter upstream of the seat.

According to yet other advantageous embodiments of the invention, the shutter is aligned with the movable part.

According to yet other advantageous embodiments of the invention, the movable part of the pressure reducer and/or regulator is a piston housed in a cylindrical portion of the body.

According to yet other advantageous embodiments of the invention, the shutter is a first shutter and the device comprises a second shutter arranged upstream of the first shutter in the passageway, the first and second shutters being mechanically linked so that the second shutter closes before the first shutter, and wherein in various implementations the first and second shutters comprise, each, a movable closure member cooperating with a respective seat fixed with the body of the device.

According to further advantageous embodiments of the invention, a spring acts on the second shutter in the normal flow of gas to close the passage way, and is mechanically linked with the first shutter by a simple mechanical stop so that the first shutter pushes the second shutter during an opening movement and there is a slight play in the mechanical connection between the two shutters when the two shutters are closed.

All the above mentioned features are optionally disclosed in all possible combinations with the object of the invention.

The invention provides a pressure reducing and/or regulating device for pressurized gas ensuring a dual function of shutoff valve and pressure reduction, the device having a single control member and having a very simple and reliable construction. Indeed, a single shutter is sufficient for the closure function and pressure reduction and/or regulation, and that for high pressures. The presence of second elastic means acting directly or indirectly on the shutter in the closing direction, combined with the fact that the control member relaxes the first elastic means guarantees a secure closure for such high pressures. Indeed, the closing action of the device corresponds to unloading the first elastic means, which is safe compared to the teaching of FR 1 393 971 where closing the device requires an effort of compressing the spring of the pressure reducer and where the control member can take an uncertain position corresponding to an intermediate position between the open and closed positions.

DRAWINGS

DETAILED DESCRIPTION

Figure 1:
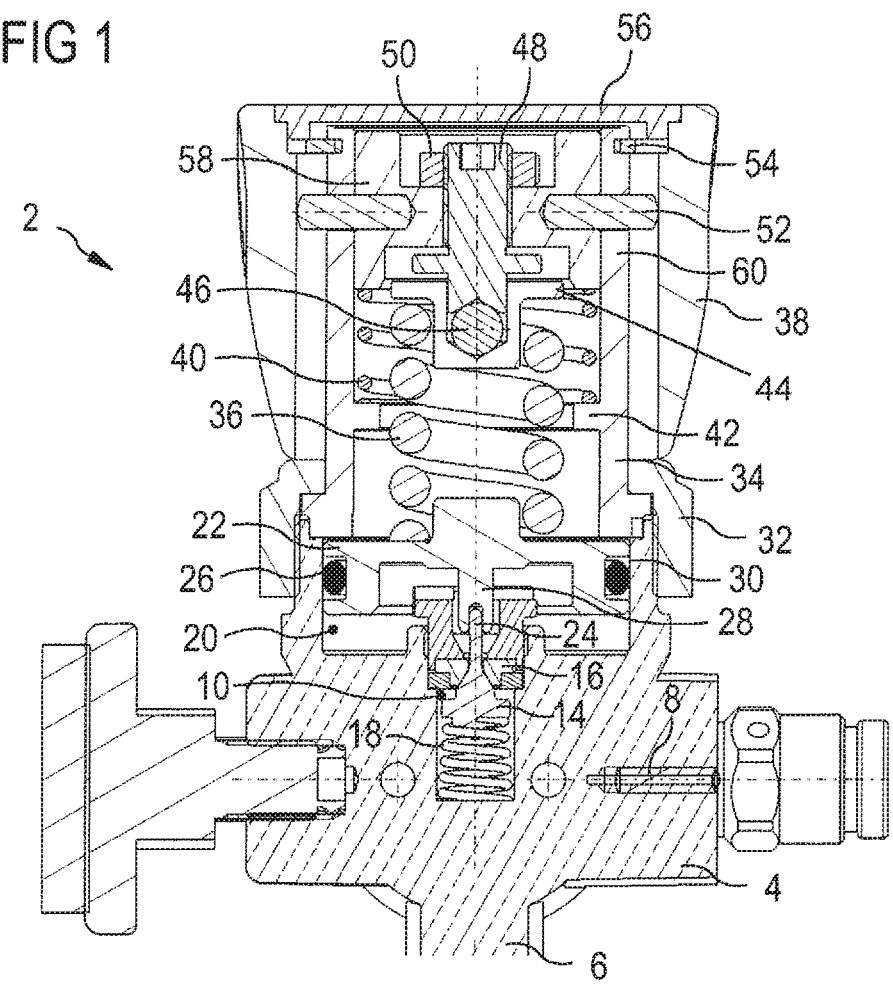
FIG. 1 is a sectional view of a valve with a pressure reducer according to various embodiments of the invention, the valve being in closed position.

FIG. 1 shows a longitudinal section of a valve with a pressure reducer and/or pressure regulator 2 according to various embodiments of the invention. In various embodiments the pressure reduction and/or regulation components and operation of the valve 2 can function as a pressure reducer and/or a pressure regulator and remain within the scope of the present invention. However, for simplicity and clarity the valve 2 will be simply referred to as the valve with pressure reducer 2. The valve with pressure reducer 2 essentially comprises a body 4 with a gas inlet 6 (not visible), a gas outlet 8 and a passage 10 inside of the body 4, connecting the inlet 6 with the outlet. It should be noted that the passage 10 is only partly visible due to the fact that certain portions of the passage 10 are not in the plane of the section illustrated in the FIG. 1.

The valve with pressure reducer 2 also includes a shutter disposed in the passage 10, the shutter comprising substantially a movable member 14 and a seat 16. The seat 16 is fixed to the body 4 by a mounting means comprising a seal and a screw element. The movable member 14 comprises a main portion cooperating with the seat 16 to close the passage 10. This main portion is disposed upstream of the seat 16 relative to the normal flow direction of the gas when the valve with pressure reducer 2 is in service. It is subject to the resilient force of a spring 18 directed in the closing direction of the shutter and in the normal direction of flow of the gas.

The movable member 14 also includes an extension 24 extending through the seat 16 and cooperating by a sliding engagement with a housing 28 of the movable part 22 of the valve with pressure reducer 2. This movable part is a piston equipped with a seal 26 sliding in a cylindrical housing 30 of the body 4. It defines with the body a cavity 20 forming a so-called low-pressure chamber disposed downstream of the shutter 14, 16.

A spring 36 is disposed on the face of the piston 58 which is opposed to the shutter 14 and 16. The end of the spring 36 opposite to the movable part 22 of the valve with pressure reducer 2 is in contact with a pusher consisting essentially of a plate 44, a ball 46 and a screw 48. The plate 44 includes a portion projecting into the interior of the spring 36. This protruding portion forms a cavity in which the ball 46 is housed. The cavity includes a concave conical surface receiving a face of the ball 46. The corresponding end of the screw 48 also includes a concave conical surface receiving the opposite face of the ball 46. The ball 46 and the conical surfaces provide a rotational connection free of, or at least with a very low, resisting torque. This connection is moreover self-centering by the interaction of the ball surface with concave conical surfaces.

The screw 48 is engaged in a corresponding thread of a piston 58 sliding in a cylindrical portion 60 of the body 4 forming a wall. In various embodiments of the present invention, the cylindrical portion 60 accommodating the piston 58 is part of a part 34 of the body which is attached to the main body 4 by means of a ring nut 32.

The piston 58 includes two pins or rods 52 extending substantially perpendicular to the longitudinal or sliding axis of the piston, and oppositely. Each of these pins 52 is rigidly fixed to the piston 58 and passes through the cylindrical wall 60 and protrudes from the outer surface of the wall in question. A generally cylindrical control wheel 38 is disposed around the cylindrical wall 60. The control wheel 38 includes two grooves 62 on its inner cylindrical surface, these grooves 62 being generally vertical and opposite. Each of the two pins 52 cooperate by engagement in one of these two grooves.

Figure 2:
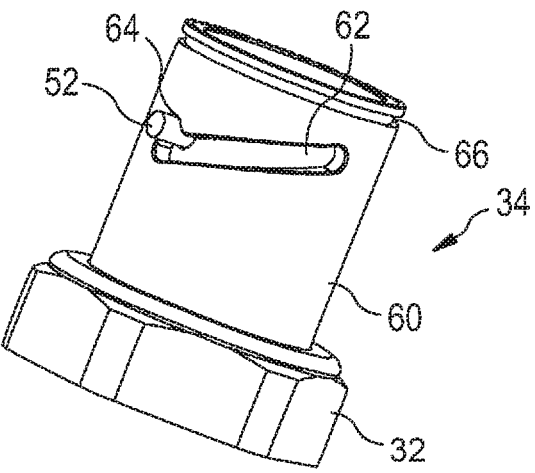
FIG. 2 is a perspective view of a cylindrical portion of a rotary control member of the valve of FIG. 1, in accordance with various embodiments of the invention.

FIG. 2 illustrates the part 34 with the ring nut 32 showing one of the two grooves 62 traversed by the pin 52. The groove 62 is inclined so as to impose a movement component of the pins 52 along the longitudinal axis the part during rotation of the control wheel 38. At least one of the grooves or guides 62 of the cylindrical wall includes a stop notch 64 of the pin 52 to a position of the piston 58 (FIG. 1) which corresponds to an operating position of the valve with pressure reducer 2. The cylindrical wall 60 also comprises a circular groove or slot 66 near its end opposite to the ring nut 32, this groove 66 being adapted to receive a snap ring 54 (FIG. 1) for retaining the control wheel 38.

Returning to FIG. 1, it is illustrated we can see that the control wheel 38 includes a cover 56 covering the top opening, near the snap ring 54. The cavity housing the piston 58 and formed by the cylindrical wall 60 includes a return spring 40 based on a shoulder 42 of the cavity and on the face of the piston 58 directed towards the side of the shutter. The spring operates in compression and is configured to bias the piston 58 upwardly when the control member consisting essentially of the wheel 38, the piston 58, the pusher 44, 46 and 48 and the pins 52, is in the closed position of the valve with pressure reducer 2. Referring to FIG. 2, this closed position is reached when the pins 52 are close to the upper ends of the grooves 62 of the cylindrical wall 60. In order to ensure satisfactory sealing, the control member is configured so as to have a stroke such that the pusher 44, 46 and 48 connected to the piston 58 becomes separated from the spring 36 of the valve with pressure reducer 2. The return spring 40 is for biasing back the piston 58 and hence the pusher 44, 46 and 48 to its furthest position from the shutter. The pusher, more particularly its plate 44 is thus held remote, albeit small, of the free end of the spring 36 of the valve with pressure reducer 2. No force in the opening direction of the shutter is thus exerted on the shutter via the working spring 36. Only the spring 18 acts on the movable member 14 of the shutter in the closing direction. In case of increase of the pressure upstream of the valve with pressure reducer 2, that is to say for example the pressure in the cylinder to which the valve with pressure reducer 2 can be connected, the pressure will increase the closing force exerted on the movable member 14. A deformation of the seat or a matting of the contact surfaces of the seat 16 and/or the movable member 14 can be absorbed by the clearance between the end of the working spring 36 and the plate 44 of the pusher. It follows from this construction an increased security with the advantages of simple construction and a rapid command.

Referring to FIGS. 1 and 2, one can observe that the rotation of the control wheel 38 clockwise will cause the rotation of the piston 58 via the pins 52 and hence its translation towards the working spring 36 of the valve with pressure reducer 2. This rotational movement of the wheel 38 will be stopped and stabilized when the pins 52 reach their respective notches 64 in the grooves 62 of the cylindrical wall 60. In this stabilized position, the plate 44 of the pusher will be in contact with the working spring 36 which will work then in a state of compression, able to oppose the opposite force of the spring 18 and force the opening of the shutter 14, 16.

Figure 3:
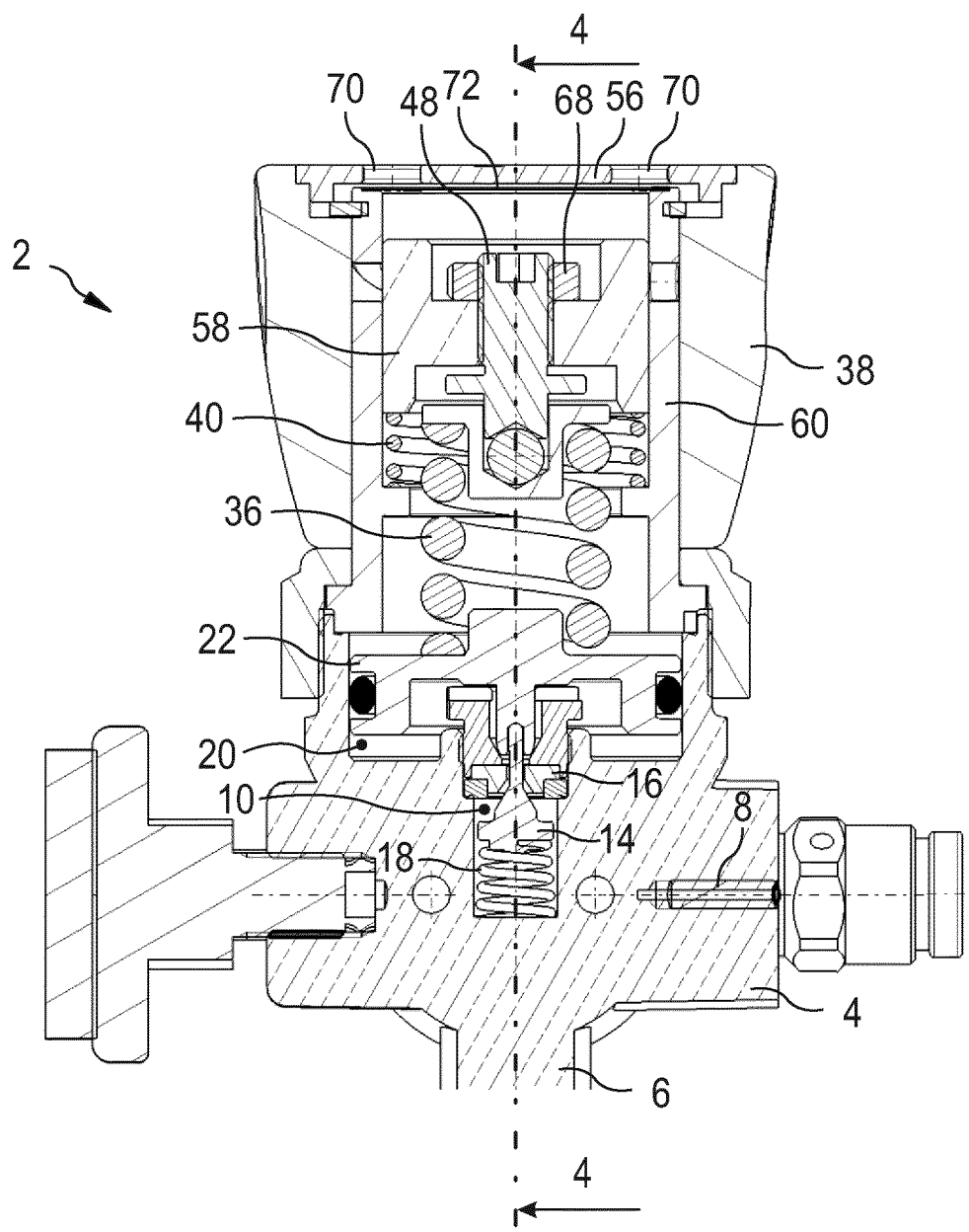
FIG. 3 is a sectional view of the valve of FIG. 1 in the operating position, in accordance with various embodiments of the invention.

This situation is illustrated in FIG. 3. It can in fact be observed that the movable part 22 of the valve with pressure reducer 2 is displaced under the effect of the force of the working spring 36 and has therefore moved the movable member 14 of the shutter so as to open the passage. The gas can flow from the high pressure area upstream of the shutter to the low pressure 20. The establishment of a pressure in the low pressure chamber 20 will exert a force directed in the direction of closing which will add to the force of the spring 18, both efforts opposing the force of the working spring 36. The principle of operation of the pressure reducer is as such well known to the skilled person.

It should be noted that in this stable operating position of the valve with pressure reducer 2, the stress of the working spring 36 can advantageously be adjusted by means of the screw 48 of the pusher. Indeed, it suffices to remove the cover 56 and release the nut 68 locking the screw 48 and then to adjust the screw 68 in question, for example through a tool such as an Allen wrench. The rotation of the screw 48 in the direction of increasing the compression of the working spring 36 will increase the pressure and/or flow outlet and vice versa, the rotation in the other direction will decrease the pressure and/or flow rate. The pressure and/or the output rate can be measured easily, which makes the final adjustment of the valve with pressure reducer 2 particularly convenient.

Figure 4:
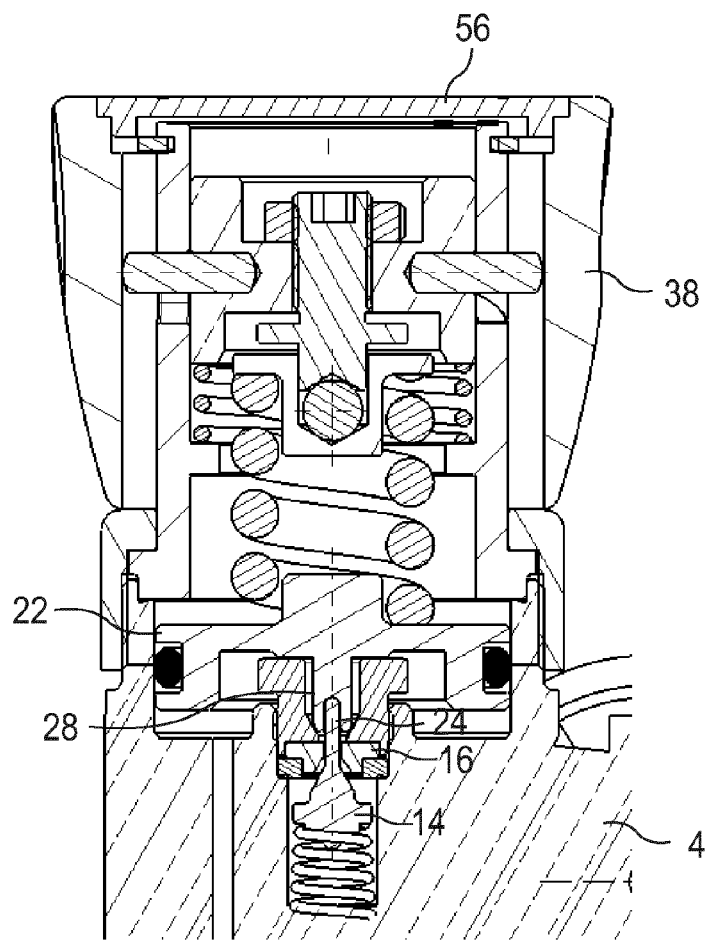
FIG. 4 is a sectional view along line 4-4 of the valve of FIG. 3, in accordance with various embodiments of the invention.

FIG. 4 is a sectional view 4-4 of the expansion valve with pressure reducer 2 of FIG. 3.

Figure 5:
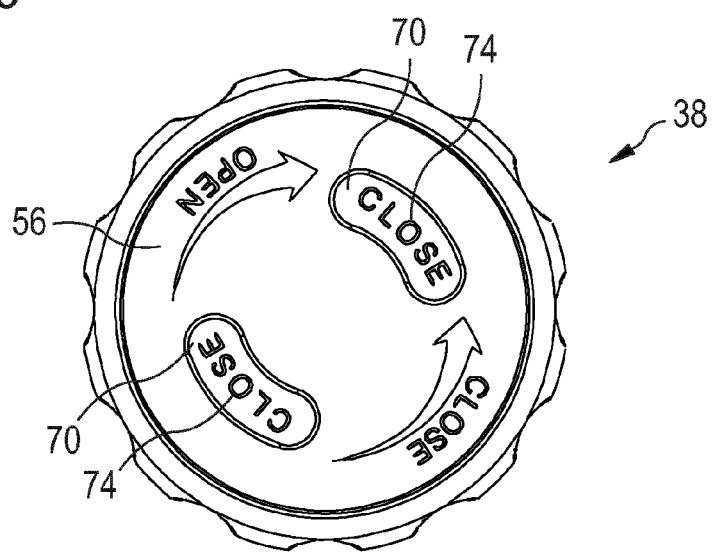
FIG. 5 is an elevation view of the rotary control member of the valve of FIGS. 1, 3 and 4, in accordance with various embodiments of the invention.

FIG. 5 is an elevation view of the control wheel 38 of the valve with pressure reducer 2 of FIGS. 1, 3 and 4. One can see the splined shape of the outer cylindrical surface of the control wheel 38. The cover 56 comprises two windows 70 displaying the status of the valve with pressure reducer 2. The valve with pressure reducer 2 comprises indeed a disk 72 (see FIG. 3) disposed on the body, especially on the cylindrical wall 60 and with a defined relative angular position, for example by means of a locating device. Inscriptions 74 such as "CLOSE" are provided on the disk 72 on areas disposed in facing relation with the windows 70 when the wheel is in the closed position of the valve with pressure reducer 2. These measures allow an easy and reliable display of the valve status. In the various embodiments of the invention described here, the angular stroke of the wheel is around one quarter of a turn and the two windows 70 are diametrically opposed. It is thus also possible to provide inscriptions expressing the open state of the valve with pressure reducer 2 such as "OPEN" to areas disposed in facing relation with the windows 70 when the wheel is in the position of opening the valve with pressure reducer 2.

It should be noted that the embodiments which that have been described in detail are purely illustrative. Indeed, many other embodiments of the invention as defined by the claims are possible. By way of example only, the construction of the pusher can be different from that which has been illustrated. The control member, in particular the means for converting the rotation of the wheel 38 into a movement of translation of the piston 58 can be different, in particular with regard to the position and/or shape of the grooves or guides 62. The valve with pressure reducer 2 that has been described includes only two positions of the control member. It is possible to provide further positions. It is also possible to provide a second shutter disposed upstream of the first and mechanically connected to the first so that the second shutter closes before the first. The mechanical connection can be provided by a sliding engagement such as that between the rod 24 of the movable member of the shutter 14, 16 and the housing 28 of the movable part 22 of the valve with pressure reducer 2 shown in FIGS. 1, 3 and 4. For example, the second shutter can be mechanically linked with the first shutter by a simple mechanical stop so that the first shutter pushes the second shutter during an opening movement and there is a slight play in the mechanical connection between the two shutters when the two shutters are closed. Such an arrangement allows to confer greater security through simple and inexpensive measures.

What is claimed is:

1. A pressure reducing device of pressurized gas, said device comprising:
 a body with a gas inlet, a gas outlet and a passage connecting the inlet to the outlet;
 a shutter disposed in the passage and adapted to close the passage;
 a pressure reducer with a movable part adapted to actuate the shutter under the effect of the gas pressure at the outlet of the valve;
 a first elastic member able to act on the movable part in the opening direction of the passage;
 a manual rotary control member adapted to open the passage acting on the shutter via the first elastic member; and
 a second elastic member acting on the shutter in the closing direction of the passage; wherein
 the control member comprises a position for closing the passage where the first elastic member is free of effort from the control member; and
 the control member further comprises a pusher acting on the first elastic member, the pusher being distant from the first elastic member in the closed position of the control member.

2. The device according to claim 1, wherein the control member is structured and operable to open and close the passage by a rotation of one of less than one turn, a half-turn, and a quarter turn.

3. The device according to claim 2, wherein the control member further comprises a piston housed in a cylindrical portion of the body of the device, a wheel and an assembly for converting rotation of the wheel into translational movement of the piston, the assembly comprising at least one pin extending through a first groove in a wall of the cylindrical portion and cooperating with a second groove of one of the wheel and the piston, at least one of the first and second grooves being inclined.

4. The device according to claim 3, wherein the pusher is disposed on the piston and includes an adjusting member relative to the piston.

5. The device according to claim 3, wherein the pusher comprises a contact ball for transmitting a compressive force on the first elastic member and disposed at least substantially on the axis of the piston, allowing rotation of the piston relative to the first elastic member.

6. The device according to claim 4, wherein the wheel is generally cylindrical and comprises a removable cover giving access to the adjusting member of the pusher.

7. The device according to claim 6, wherein the wheel comprises at least one window opposite the piston, the device further comprising at least one indication able to be seen through the at least one window in a position of the wheel corresponding to one of the open and closed positions.

8. The device according to claim 7, wherein the at least one window is disposed on the removable cover.

9. The device according to claim 1, wherein the control member further comprises an elastic return member structured and operable for releasing the first elastic member of compressive stresses.

10. The device according to claim 1, wherein the shutter is structured and operable so that the movement of the shutter in the closing direction of the passage is oriented essentially according to a gas flow in use.

11. The device according to claim 10, wherein the shutter comprises a movable member and a seat, the movable member extending through the passage at the level of the seat and being linked to the movable part of the pressure reducer.

12. The device according to claim 10, wherein the shutter further comprises a movable member and a seat, the movable member extending through the passage at the level of the seat and cooperating by sliding engagement with the movable part of the pressure reducer.

13. The device according to claim 12, wherein the sliding engagement comprises a stop in a direction where the movable part of the pressure reducer gets closer to the movable member of the shutter, and the engagement is free in the opposite direction.

14. The device according to claim 12, wherein the second elastic member acts directly on the movable element of the shutter upstream of the seat.

15. The device according to claim 1, wherein the second elastic member directly acts on the movable part of the pressure reducer.

16. The device according to claim 1, wherein the shutter is aligned with the movable part of the pressure reducer.

17. The device according to claim 1, wherein the movable part of the pressure reducer is a piston housed in a cylindrical portion of the body.

* * * * *